(12) United States Patent
Arakawa et al.

(10) Patent No.: US 10,920,683 B2
(45) Date of Patent: Feb. 16, 2021

(54) CONTROL DEVICE FOR INTERNAL COMBUSTION ENGINE

(71) Applicant: Hitachi Automotive Systems, Ltd., Hitachinaka (JP)

(72) Inventors: Takafumi Arakawa, Tokyo (JP); Kunihiko Suzuki, Tokyo (JP); Yoichi Iihoshi, Tokyo (JP); Haoyun Shi, Tokyo (JP); Toshio Hori, Hitachinaka (JP); Yoshikuni Kurashima, Hitachinaka (JP)

(73) Assignee: Hitachi Automotive Systems, Ltd., Hitachinaka (JP)

( * ) Notice: Subject to any disclaimer, the term of this patent is extended or adjusted under 35 U.S.C. 154(b) by 0 days.

(21) Appl. No.: 16/624,446

(22) PCT Filed: Jun. 4, 2018

(86) PCT No.: PCT/JP2018/021312
§ 371 (c)(1),
(2) Date: Dec. 19, 2019

(87) PCT Pub. No.: WO2019/003806
PCT Pub. Date: Jan. 3, 2019

(65) Prior Publication Data
US 2020/0123989 A1    Apr. 23, 2020

(30) Foreign Application Priority Data

Jun. 28, 2017 (JP) .................................. 2017-125947

(51) Int. Cl.
*F02D 41/00* (2006.01)
*F02D 21/08* (2006.01)
(Continued)

(52) U.S. Cl.
CPC ......... *F02D 21/08* (2013.01); *F02D 41/0072* (2013.01); *F02D 2041/0017* (2013.01);
(Continued)

(58) Field of Classification Search
CPC .. F02D 21/08; F02D 41/0072; F02D 41/0007; F02D 2041/0017;
(Continued)

(56) References Cited

U.S. PATENT DOCUMENTS

2012/0303247 A1  11/2012  Minami et al.
2012/0303249 A1  11/2012  Minami et al.
(Continued)

FOREIGN PATENT DOCUMENTS

JP    2001-280202 A    10/2001
JP    2004-11618 A     1/2004
(Continued)

OTHER PUBLICATIONS

International Search Report (PCT/ISA/210) issued in PCT Application No. PCT/JP2018/021312 dated Oct. 2, 2018 with English translation (five pages).
(Continued)

*Primary Examiner* — Hai H Huynh
(74) *Attorney, Agent, or Firm* — Crowell & Moring LLP (57) ABSTRACT

Provided is a novel control device of an internal combustion engine capable of estimating an EGR rate in a transient state with high accuracy. Thus, in the present invention, unit spaces are formed by dividing a reference space of the intake passage into a plurality of spaces along a streamline through which the gas mixture of the intake air and the EGR gas flows, a physical model based on an advection equation for estimating the EGR rate of the gas mixture is established so as to correspond to each of the unit spaces, and the EGR rate at which the gas mixture flows into the combustion chamber (Continued)

is estimated by sequentially estimating the EGR rates of the unit spaces connected to head unit spaces from the head unit spaces by the physical model.

11 Claims, 10 Drawing Sheets

(51) Int. Cl.
*F02M 26/05* (2016.01)
*F02M 26/06* (2016.01)
*F02M 26/47* (2016.01)

(52) U.S. Cl.
CPC ............... *F02D 2200/0402* (2013.01); *F02D 2200/0406* (2013.01); *F02M 26/05* (2016.02); *F02M 26/06* (2016.02); *F02M 26/47* (2016.02)

(58) Field of Classification Search
CPC ..... F02D 2200/0402; F02D 2200/0406; F02D 2200/0408; F02M 26/05; F02M 26/06; F02M 26/47; F02P 5/1516
USPC ....... 123/568.19, 568.21; 701/103–105, 108; 73/114.74
See application file for complete search history.

(56) References Cited

U.S. PATENT DOCUMENTS

| | | |
|---|---|---|
| 2012/0303250 A1 | 11/2012 | Nogami et al. |
| 2012/0303346 A1 | 11/2012 | Takezoe et al. |
| 2014/0311450 A1 | 10/2014 | Minami et al. |

FOREIGN PATENT DOCUMENTS

| | | |
|---|---|---|
| JP | 2010-96060 A | 4/2010 |
| JP | 2012-246849 A | 12/2012 |
| JP | 2012-246850 A | 12/2012 |
| JP | 2013-11270 A | 1/2013 |
| JP | 2013-11271 A | 1/2013 |
| JP | 2014-1666 A | 1/2014 |
| JP | 2014-211090 A | 11/2014 |
| JP | 2015-63967 A | 4/2015 |
| JP | 2015-206275 A | 11/2015 |

OTHER PUBLICATIONS

Japanese-language Written Opinion (PCT/ISA/237) issued in PCT Application No. PCT/JP2018/021312 dated Oct. 2, 2018 (four pages).

CONTROL DEVICE FOR INTERNAL COMBUSTION ENGINE

TECHNICAL FIELD

The present invention relates to a control device of an internal combustion engine, and particularly, to a control device of an internal combustion engine including an external EGR system.

BACKGROUND ART

Regulations on fuel consumption and exhaust harmful components of vehicles are being strengthened, and are expected to become stricter in the future. In particular, since discharged carbon dioxide greatly influences global warming, reduction in fuel consumption is further required for the fuel consumption.

In order to promote the reduction in fuel consumption, there is a tendency to increase a compression ratio of an internal combustion engine by mounting a supercharger in recent years. However, a possibility of abnormal combustion such as knocking is increased under an operating condition in which an output of the internal combustion engine is relatively high when the compression ratio is increased. Thus, a temperature in a combustion chamber is reduced by delaying the ignition timing, and thus, the abnormal combustion is avoided.

However, when the ignition timing is delayed, there is a problem that the fuel consumption is accordingly deteriorated. Thus, an external EGR system is provided in the internal combustion engine, and the fuel consumption is improved by advancing the ignition timing to an appropriate value while suppressing the abnormal combustion by introducing an exhaust gas to an intake pipe from an exhaust pipe. In recent years, it is required to further increase the amount of exhaust gas introduced.

Meanwhile, when a large amount of exhaust gas is reintroduced into the intake pipe, combustion fluctuations are likely to occur, whereas exhaust gas harmful components are increased. Accordingly, the amount of exhaust gas reintroduced into the intake pipe, that is, the EGR rate is accurately estimated, and thus, it is important to reflect the estimated EGR rate on control output signals for controlling a fuel injection amount, an ignition timing, and an EGR amount to be given to the internal combustion engine. JP 2001-280202 A (PTL 1) and JP 2004-11618 A (PTL 2) are known as a method of estimating the EGR rate.

PTL 1 discloses an exhaust gas recirculation system of an internal combustion engine capable of accurately controlling exhaust gas recirculation by accurately estimating an EGR flow rate from a difference between pressures in front and rear of an EGR valve and an EGR valve opening degree. PTL discloses an EGR rate estimation system of an internal combustion engine that accurately estimates an EGR rate of a gas mixture introduced into the combustion chamber regardless of an operating state of the internal combustion engine by simulating a transfer procedure of the gas mixture within a branch according to an actual situation in consideration of the compression and expansion of the gas mixture including the exhaust gas.

CITATION LIST

Patent Literature

PTL 1: JP 2001-280202 A
PTL 2: JP 2004-11618 A

SUMMARY OF INVENTION

Technical Problem

Incidentally, a low-pressure EGR system that extracts an exhaust gas from a downstream side of a turbine of the supercharger provided at the exhaust pipe and introduces the extracted exhaust gas to an upstream side of a compressor of the supercharger provided at the intake pipe is known in the external EGR system. In this low-pressure EGR system, there is a relatively long distance on the pipe from a portion at which the exhaust gas is introduced into the intake pipe to the combustion chamber. Various devices, for example, a throttle valve, an intercooler, and a surge tank are arranged at this pipe. An intake air and an exhaust gas pass through the throttle valve, the intercooler, and the surge tank while moving through the long pipe.

Thus, as described in PTL 1, in the method of obtaining the EGR amount only by the EGR valve opening degree and the difference between the pressures on the upstream and downstream sides of the EGR valve, there is a problem that estimation accuracy of the EGR rate during transition in which an operation region of the internal combustion engine is variously changed is deteriorated. As described in PTL 2, the method of dividing the intake pipe can improve the estimation accuracy of the EGR rate. However, when the gas mixture is moved from the upstream side while correcting the EGR rate according to a change in pressure, there is a problem that the estimation accuracy is not sufficient as the estimation accuracy of the EGR rate in the actual transient.

An object of the present invention is to provide a control device of an internal combustion engine capable of estimating an EGR rate during transition with high accuracy.

Solution to Problem

A feature of the present invention is that unit spaces are formed by dividing a reference space of an intake passage into a plurality of spaces along a streamline through which a gas mixture of an intake air and an EGR gas flows, a physical model based on an advection equation for estimating an EGR rate of the gas mixture is established so as to correspond to each unit space, and an EGR rate at which the gas mixture flows into a combustion chamber is estimated by sequentially estimating the EGR rates of the unit spaces connected to head unit spaces from the head unit spaces by the physical model.

Advantageous Effects of Invention

According to the present invention, it is possible to estimate the EGR rate with high accuracy even in the transient state in which the operating state of the internal combustion engine is variously changed.

DESCRIPTION OF EMBODIMENTS

Hereinafter, although embodiment of the present invention will be described in detail with reference to the drawings, the present invention is not limited to the following embodiment, and various modifications and applications can be made within a technical concept of the present invention.

Embodiment 1

Figure 1:
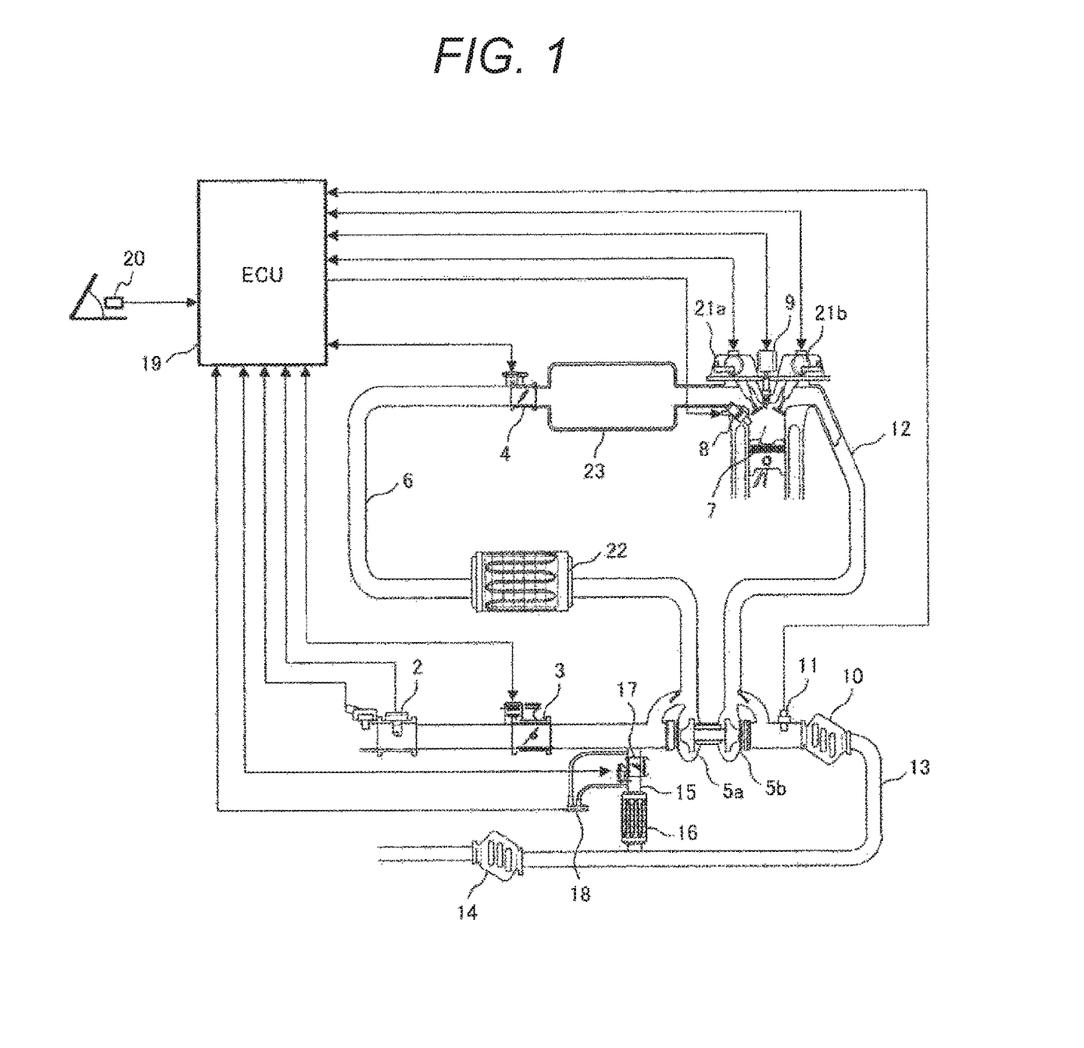
FIG. 1 is a configuration diagram illustrating a configuration of an internal combustion engine system to which the present invention is applied.

FIG. 1 illustrates a configuration of an internal combustion engine system to which the present invention is applied. In FIG. 1, an internal combustion engine 1 is a spark-ignition internal combustion engine. In FIG. 1, a mass flowmeter 2 that measures an air flow rate, a pressure adjustment valve 3 that adjusts an intake pressure, a throttle valve 4 that adjusts a flow rate of a gas mixture of an intake air and an exhaust gas, and a compressor 5b of a supercharger that compresses the gas mixture are provided at appropriate positions of an intake passage 6.

A fuel injection valve 8 that injects fuel into a combustion chamber 7 and an ignition plug 9 that supplies ignition energy are provided at appropriate positions of the internal combustion engine 1. Furthermore, a turbine 5b that drives the compressor 5a by using energy of the exhaust gas, a three-way catalyst 10 that purifies the exhaust gas, and an air-fuel ratio sensor 11 which is an aspect of an air-fuel ratio detector and detects an air-fuel ratio of the exhaust gas on an upstream side of the first three-way catalyst 10 are provided at appropriate positions of an exhaust pipe 12. The air-fuel ratio sensor 11 may be an oxygen concentration sensor.

An exhaust passage 13 is connected on a downstream side of the first three-way catalyst 10, and a second three-way catalyst 14 is provided at an appropriate position of the exhaust passage 13. An EGR pipe 15 that extracts a recirculation exhaust gas (hereinafter, referred to as an EGR gas) is branched from the upstream side of the second three-way catalyst 14 of the exhaust passage 13. An EGR cooler 16 that cools the EGR, an EGR valve 17 that adjusts an EGR gas amount, and a pressure sensor 18 that measures pressures in front and rear of the EGR valve are provided at appropriate positions of the EGR pipe 15.

A detection signal obtained from the air-fuel ratio sensor 11, a detection signal obtained from the mass flowmeter 2, and a detection signal obtained from an intake pipe pressure sensor (not illustrated) are sent to a control unit (hereinafter, referred to as an ECU) 19. Similarly, a signal obtained from an accelerator opening degree sensor 20 that detects the step-on amount of an accelerator pedal, that is, an accelerator opening degree is also sent to the ECU 19.

The ECU 19 calculates a required torque based on detection signal of the accelerator opening degree sensor 20 and various sensor signals. That is, the accelerator opening degree sensor 20 is used as a required torque detection sensor that detects a required torque for the internal combustion engine 1. The ECU 19 appropriately calculates important operating amounts of the internal combustion engine 1 such as an opening degree of the pressure adjustment valve 3, an opening degree of the throttle valve 4, an injection pulse period of the fuel injection valve 8, an ignition timing of the ignition plug 9, opening and closing timings of an intake valve 21a and an exhaust valve 21b, and an opening degree of the EGR valve 17 based on an operating state of the internal combustion engine 1 obtained from outputs of various sensors described above.

The fuel injection pulse period calculated by the ECU 19 is converted into a valve opening pulse signal of the fuel injection valve 8, and the converted signal is sent to the fuel injection valve 8. Further, the opening degree of the pressure adjustment valve 3 calculated by the ECU 19 is sent, as a pressure adjustment valve drive signal, to the pressure adjustment valve 3. Hereinafter, similarly, the opening degree of the throttle valve 4 calculated by the ECU 19 is sent, as a throttle valve drive signal, to the throttle valve 4, an ignition timing signal of the ignition plug 9 is sent to the ignition plug 9, and the opening degree of the EGR valve 17 is sent, as an EGR valve drive signal, to the EGR valve 17.

An air-fuel mixture is formed within the combustion chamber 7 by injecting fuel to the gas mixture flowed into the combustion chamber 7 via the intake valve 21a after passing through an intercooler 22, the intake passage 6, and a surge tank 23 from a fuel tank via a fuel pump (not illustrated) and the fuel injection valve 8. The air-fuel mixture is ignited and burned by a spark generated from the ignition plug 9 at a predetermined ignition timing. A piston is pushed down by a combustion pressure, and a drive force of the internal combustion engine 1 is generated.

The exhaust gas after combustion is sent to the first three-way catalyst 10 via the exhaust valve 21b, the exhaust pipe 12, and the turbine 5b, and NOx, CO, and HC components are purified within the first three-way catalyst 10. Thereafter, the exhaust gas is purified again by the second three-way catalyst 14 via the exhaust passage 13 and is discharged to the outside.

A part of the exhaust gas is introduced, as the EGR gas, into the intake passage 6 via the EGR pipe 15, the EGR cooler 16, and the EGR valve 17, and the intake air and the EGR gas are merged in this introduction region. The gas mixture of the intake air and the EGR gas flows along a streamline that follows a shape of the intake passage 6, reaches an inlet of the combustion chamber 7, and is sucked into the combustion chamber.

Figure 2:
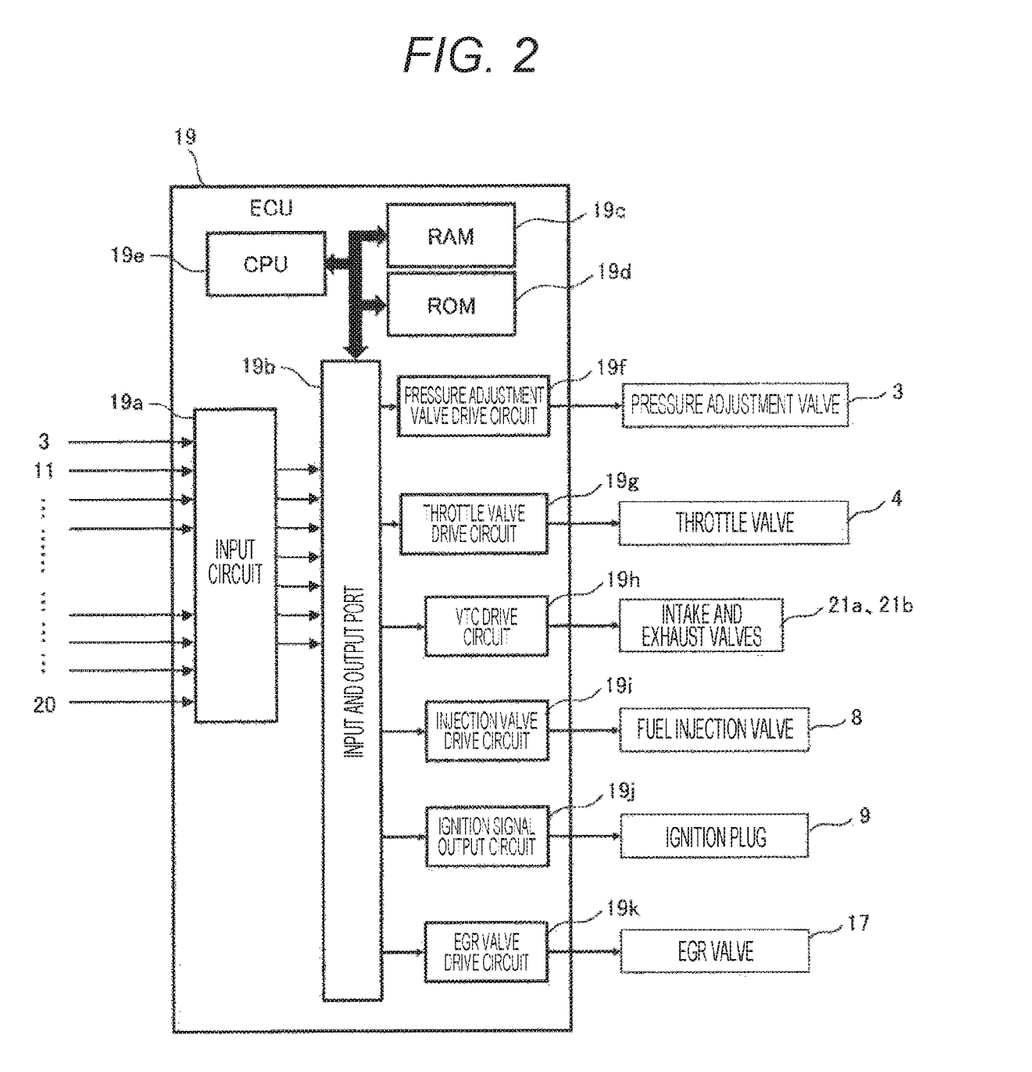
FIG. 2 is a functional block diagram illustrating control means illustrated in FIG. 1 by functional blocks.

FIG. 2 illustrates functional blocks of the ECU 19 used in the present embodiment. The detection signals from the sensors such as the mass flowmeter 2, the air-fuel ratio sensor 11, and the accelerator opening degree sensor 20 are input to an input circuit 19a of the ECU 19. However, the input signals are not limited thereto. The input detection signals from the sensors are sent to input ports within an input and output port 19b. Values of the detection signals sent to the input and output port 19b are temporarily stored in a random access memory (RAM) 19a, and are calculated by a CPU 19e. At this time, among the detection signals sent to the input circuit 19a, the detection signal input as an analog signal is converted into a digital signal by an A/D converter provided in the input circuit 19a.

A control program that describes contents of a calculation process is written in advance in a read only memory (ROM) 19d. Values indicating the operation amounts of actuators calculated according to the control program are temporarily stored in the RAM 19a. Thereafter, the values are sent to output ports of the input and output port 19b, and are sent to the actuators via drive circuits.

In the case of the present embodiment, a pressure adjustment valve drive circuit 19f, a throttle valve drive circuit 19g, a variable valve mechanism (VTC) drive circuit 19h, a fuel injection valve drive circuit 19i, an ignition signal output circuit 19j, and an EGR valve drive circuit 19k are provided as the drive circuits. The drive circuits control the pressure adjustment valve 3, the throttle valve 4, the fuel injection valve 8, the ignition plug 9, the EGR valve 17, and the intake and exhaust valves 21a, 21b. Although the ECU 19 of the present embodiment includes the above-described drive circuits therein, the present embodiment is not limited thereto, and any or all of the drive circuits may be provided on the outside by being integrated into each actuator separately from the ECU 19.

Figure 3:
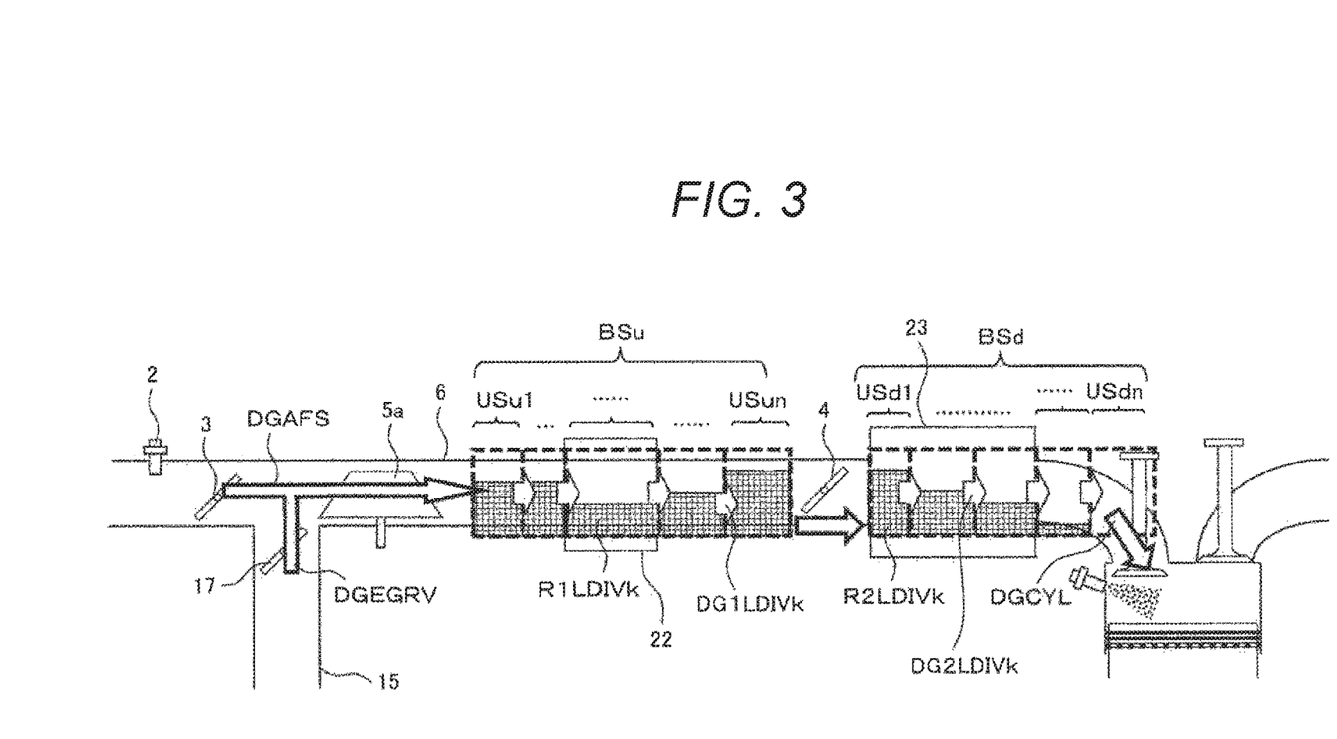
FIG. 3 is an explanatory diagram for describing a physical model for estimating an EGR rate of each unit space as the basis of the present invention.

In a control device of the internal combustion engine having the above-described configuration, the specific configuration of the first embodiment of the present invention will be described below. FIG. 3 illustrates an overview for describing the idea for estimating an EGR rate with high accuracy according to the present embodiment.

The idea as a basis of the present embodiment is to estimate the EGR rate by describing a transfer state of the EGR gas when the EGR gas flows through the intake passage 6 in a physical model for each unit space of the intake passage 6, and the physical model is established on the basis of an advection equation.

In FIG. 3, calculation regions divided into two spaces of an upstream space and a downstream space with the throttle valve 4 as a boundary are initially set in the present embodiment. These two regions are referred to as an upstream reference space BSu and a downstream reference space BSd, respectively. The upstream reference space BSu is basically set from a merging portion of the EGR gas to the throttle valve 4, but is set from the compressor 5a to the throttle valve 4 in FIG. 3 for the sake of convenience. Accordingly, a region from the merging portion of the EGR gas to the compressor 5a may be added as a new reference space. Further, the downstream reference space BSd is basically set from the throttle valve 4 to the inlet of the combustion chamber 7.

Gas pressures, gas temperatures, and gas masses of the gas mixtures present within the reference spaces BSu and BSd are calculated, and gas mixture flow rates flowing out from the calculation regions of the reference spaces BSu and BSd are calculated. The gas pressures, gas temperatures, and gas masses of the gas mixtures present within the reference spaces BSu and BSd obtained herein are parameters used to obtain intermediate gas flow rates and EGR rates to be described below.

In the present embodiment, the reference spaces BSu and BSd are set by being divided into a plurality of unit spaces USu1 to USun and a plurality of unit spaces USd1 to USdn. Then, the intermediate flow rates and the EGR rates of the gas mixtures passing between the unit spaces USu1 to USun and the unit spaces USd1 to USdn of the reference spaces BSu and BSd are sequentially calculated from the head unit space USu1 of the reference upstream space BSu, and thus, a delay of the EGR gas in reaching the combustion chamber 7 is estimated. A "white arrow" depicted at a boundary between the unit spaces illustrated in FIG. 3 indicates the intermediate gas flow rate of each unit space, and a "grid pattern" depicted in the unit space indicates the EGR rate at a certain time.

In FIG. 3, "R1LDIV[k]" and "R2LDIV[k]" indicate the EGR rates. "R1LDIV[k]" indicates the EGR rate of each unit space of the upstream reference space BSu, and "R2LDIV[k]" indicates the EGR rate of each unit space of the downstream reference space BSd. Similarly, "DG1LDIV[k]" and "DG2LDIV[k]" indicate the intermediate gas flow rates. "DG1LDIV[k]" indicates the intermediate gas flow rate of each unit space of the upstream reference space BSu, and "DG2LDIV[k]" is the intermediate gas flow rate of each unit space of the downstream reference space BSd. Here, [k] is a number indicating a division position of the unit space given from the upstream side. "DGCYL" indicates a combustion chamber intake gas flow rate ultimately sucked into the combustion chamber.

Here, the EGR gas flows from a merging region of the EGR pipe 15 and the intake passage 6 to the inlet of the combustion chamber 7 (arrangement position of the intake valve). Accordingly, the reference space BS and the unit space US may be divided within this range.

As the division positions of the reference space BS, the boundaries between the throttle valve 4, the intercooler 22, and the surge tank 23 can be set as the division positions. In an arrangement region of the throttle valve 4, a cross-sectional area of the intake passage 6 is variably adjusted, and in arrangement regions of the intercooler 22 and the surge tank 23, the cross-sectional area of the intake passage 6 is enlarged. Thus, it is desirable that the reference space is divided with these arrangement regions as the boundaries in order to improve calculation accuracy. That is, a "cross-sectional area change portion" at which the cross-sectional area of the intake passage 6 is enlarged or reduced may be used as a division point. As stated above, the reference space is divided according to an actual shape of the intake passage 6, and thus, it is possible to simulate an actual fluctuation situation of the EGR rate. As a result, it is possible to estimate the EGR rate with high accuracy.

When the reference space is divided into unit spaces, it is basically desirable that each unit space is divided into equal volumes. However, it is desirable that the intercooler 22 is used as a single unit space, and it is desirable that the surge tank 23 is used as a plurality of unit spaces. However, since these unit spaces vary depending on the shape of the intake passage 6, the intercooler 22 may be used as a plurality of unit spaces, or the surge tank 23 may be used as a single unit space.

The number of divided unit spaces can be set based on the volume of the intake passage 6 and the maximum gas flow rate at which the gas mixture is sucked into the internal combustion engine. For example, the larger the volume of the intake passage 6 and the larger the maximum gas flow rate, the greater the number of divided unit spaces. Next, a specific method of estimating the EGR rate according to the present embodiment based on these ideas will be described with reference to FIGS. 4 to 7.

Figure 4:
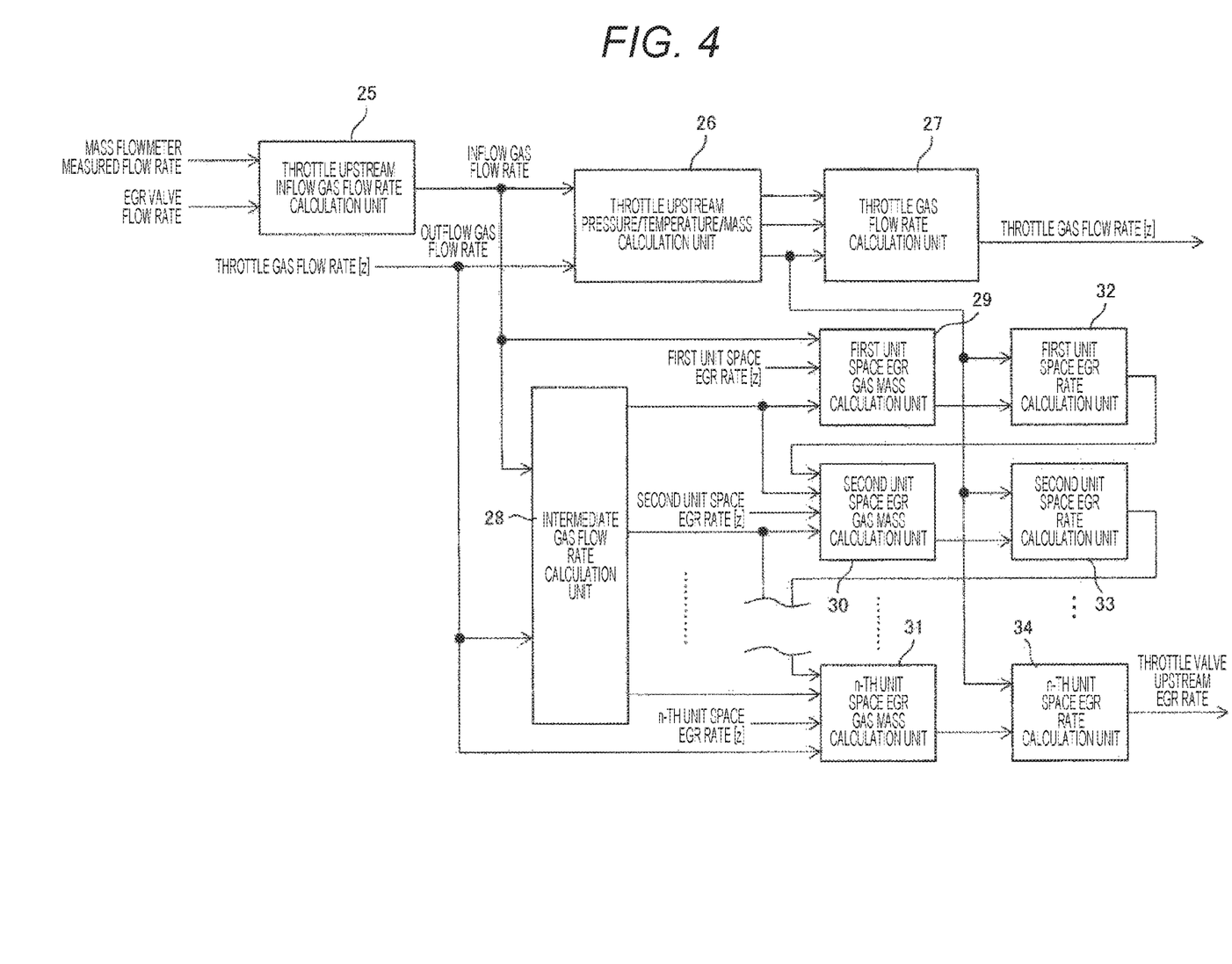
FIG. 4 is a block diagram illustrating functional blocks of the physical model for estimating the EGR rate according to a first embodiment of the present invention.

FIG. 4 illustrates a calculation block according to the present embodiment, and particularly illustrates a calculation block of the upstream reference space BSu on the upstream side of the throttle valve 4. The details of each calculation in the calculation block illustrated in FIG. 4 will be described with reference to a control flow illustrated in FIG. 5, and thus, the calculation block will be simply described in FIG. 4. In FIG. 4, a reference numeral "z" being assigned to the gas flow rate and the EGR rate means that the gas flow rate and the EGR rate are obtained in a previous calculation cycle.

The calculation block in the downstream reference space BSd on the downstream side of the throttle valve 4 is achieved by changing an inflow gas flow rate illustrated in FIG. 4 from a compressor passing flow rate to a combustion chamber intake gas flow rate and changing an application destination of the EGR rate calculated by an n-th unit space EGR rate calculation unit from a throttle valve upstream EGR rate to an intake gas EGR rate. Internal calculation processes are the same, and thus, the description thereof is omitted.

In FIG. 4, a throttle upstream inflow gas flow rate calculation unit 25 calculates an inflow gas flow rate from the air flow rate measured by the mass flowmeter 2 and the EGR gas flow rate passing through the EGR valve 17. The inflow gas flow rate is input to a throttle upstream pressure/temperature/mass calculation unit 26, and the throttle upstream pressure/temperature/mass calculation unit 26 calculates the gas pressure, gas temperature, and gas mass in the upstream reference space. The gas pressure, gas temperature, and gas mass are input to a throttle gas flow rate calculation unit 27, and a throttle gas flow rate passing through the throttle valve 4 is calculated. The above-described processes correspond to steps S505 to S507 illustrated in FIG. 5.

The inflow gas flow rate calculated by the throttle upstream inflow gas flow rate calculation unit 25 and the throttle gas flow rate obtained at the previous calculation timing are input, as an outflow gas flow rate, to an intermediate gas flow rate calculation unit 28. The intermediate gas flow rate calculation unit 28 calculates an intermediate gas flow rate for each unit space. The above-described process corresponds to step S508 illustrated in FIG. 5.

The intermediate gas flow rate from the intermediate gas flow rate calculation unit 28 is sequentially input to a first unit space EGR mass calculation unit 29, a second unit space EGR mass calculation unit 30, and an n-th unit space EGR mass calculation unit 31, and the EGR gas masses of the unit spaces are sequentially calculated along a movement direction of the gas mixture. The unit space EGR rates obtained at the previous calculating timing are input to the unit space EGR mass calculation units 29 to 31, and the EGR mass is calculated by multiplying the intermediate gas flow rates by the EGR rates. The above-described process corresponds to step S509 illustrated in FIG. 5.

Figure 5:
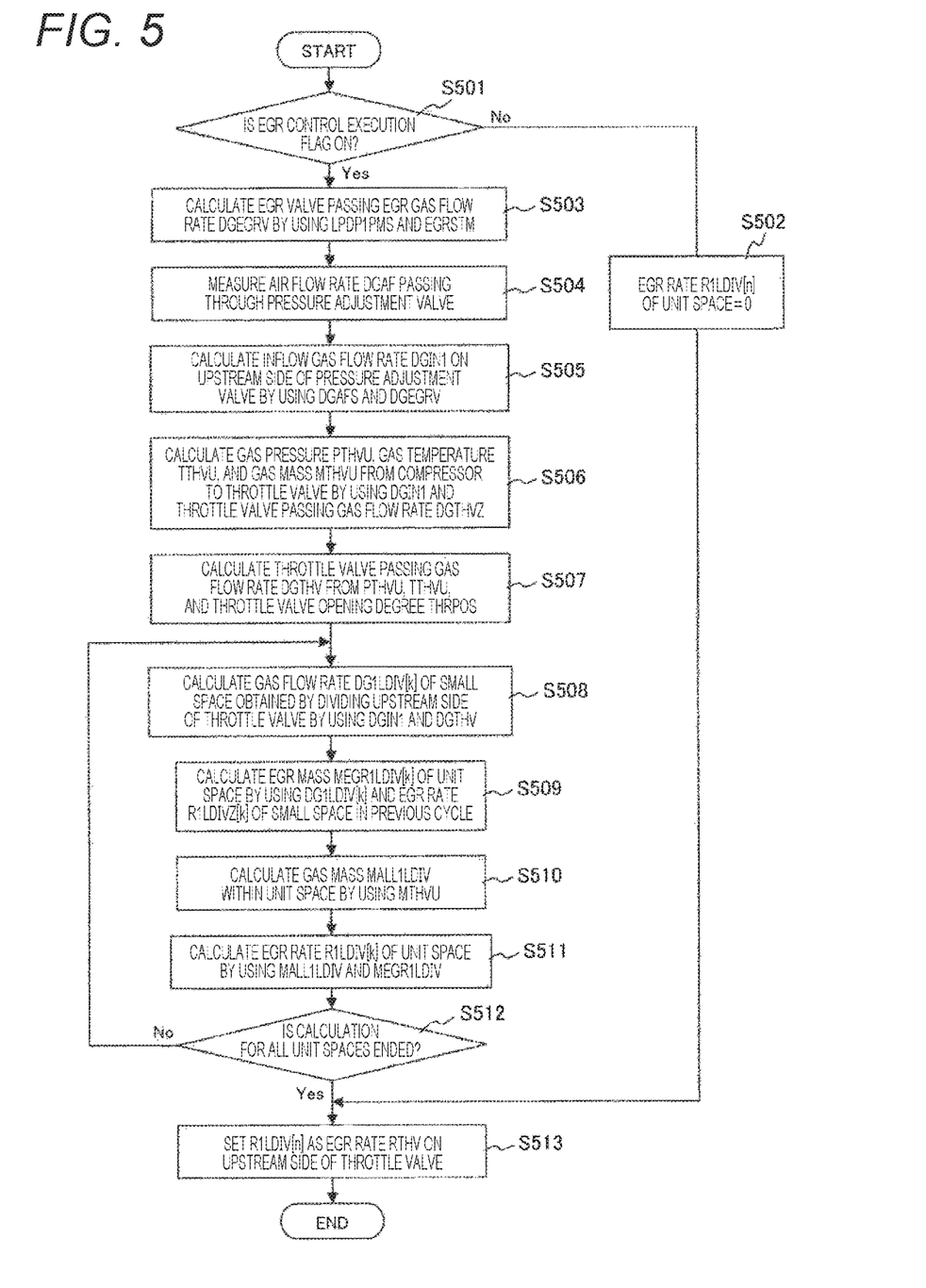
FIG. 5 is a flowchart illustrating a control flow for executing the functional blocks illustrated in FIG. 4 and obtaining an EGR rate in an upstream reference space.

The EGR gas masses from the unit space EGR mass calculation units 29 to 31 are sequentially input to a first unit space EGR rate calculation unit 32, a second unit space EGR rate calculation unit 33, and an n-th unit space EGR rate calculation unit 34, and new EGR rates of the unit spaces are sequentially calculated along the movement direction of the gas mixture. The gas pressure, gas temperature, and gas mass obtained by the throttle upstream pressure/temperature/mass calculation unit 26 are input to the unit space EGR rate calculation units 32 to 34, and the EGR rate is calculated from a current gas mixture mass and EGR gas mass.

The EGR rate ultimately calculated by the n-th unit space EGR rate calculation unit 33 is estimated as the current EGR rate on the upstream side of the throttle valve. The above-described processes correspond to steps S510 to S513 illustrated in FIG. 5.

The calculation block described above is actually executed by a microcomputer, and this specific control flow will be described below with reference to FIG. 5. The control flow illustrated in FIG. 5 illustrates a method of estimating the EGR rate of the upstream reference space BSu at the intake passage 6 from the compressor 5a of the supercharger to the throttle valve 4. In the display of the parameters used for the calculation, "1" indicates the upstream reference space. Meanwhile, in FIG. 6, since the EGR rate of the downstream reference space is described, "2" is given.

In step S501, it is determined whether or not an EGR control execution flag is "ON". When the EGR control execution flag is "OFF", the process proceeds to step S502, the EGR rate "R1LDIVn" of the lowermost downstream unit space is set to "0", and the process proceeds to step S513. Meanwhile, when the EGR control execution flag is "ON", the process proceeds to step S503.

In step S503, the EGR valve passing EGR flow rate "DGEGRV" is calculated from the EGR valve opening degree "EGRSTM" and the EGR valve front and rear pressures "LPDP1PMS". When the EGR valve passing EGR gas flow rate is obtained, the process proceeds to step S504.

In step S504, the air flow rate "DGAFS" passing through the pressure adjustment valve 3 is measured by the mass flowmeter 2. When the air flow rate is obtained, the process proceeds to step S505.

In step S505, the EGR valve passing EGR gas flow rate "DGEGRV" and the air flow rate "DGAFS" are summed, and the inflow gas flow rate (=compressor passing gas flow rate) "DGIN1" on the upstream side of the pressure adjustment valve 3 is calculated. When the inflow gas flow rate "DGIN1" is obtained, the process proceeds to step S506.

In step S506, the gas pressure "PTHVU", the gas temperature "TTHVU", and the gas mass "MTHVU" at the intake passage 6 (hereinafter, referred to as the upstream reference space) between the compressor 5a of the supercharger and the throttle valve 4 are calculated by using the inflow gas flow rate "DGIN1" and the passing gas flow rate "DGTHVZ" of the throttle valve 4 calculated in the previous calculation cycle. When the gas pressure "PTHVU", the gas temperature "TTHVU", and the gas mass "MTHVU" are obtained, the process proceeds to step S507.

In step S507, the current passing gas flow rate "DGTHV" of the throttle valve 4 is calculated by using the gas pressure "PTHVU", the gas temperature "TTHVU", and the gas mass "MTHVU". Since the calculation in steps S506 and S507 may be performed by a known method, the detailed description thereof is omitted. When the passing gas flow rate "DGTHV" of the throttle valve 4 is obtained, the process proceeds to step S508.

In step S508, the intermediate gas flow rates "DG1LDIV[k]" of the unit spaces of the upstream reference space are calculated by using the inflow gas flow rate "DGIN1" and the passing gas flow rate "DGTHV" of the throttle valve 4 based on Expression (1) to be represented below.

[Expression 1]

$$DG1LDIV[k] = \frac{(n-k)}{n}DGIN1 + \frac{k}{n}DGTHV \quad (1)$$

Here, "n" in Expression (1) is the number of divided unit spaces, and "k" is a number indicating the division positions of the unit spaces. That is, Expression (1) sequentially calculates the current intermediate gas flow rates "DG1LDIV[k]" in the unit spaces from k=1 to k=n. When the intermediate gas flow rates "DG1LDIV[k]" are obtained, the process proceeds to step S509.

In step S509, the current EGR masses "MEGR1LDIV[k]" of the unit spaces are calculated by using the intermediate gas flow rates "DG1LDIV[k]" and the unit space EGR rates "R1LDIVZ[k]" calculated in the previous calculation cycle based on Expression (2) to be represented below.

The above-described parameter "Z" indicates the calculated value in the previous calculation cycle, and [k−1] in Expression (2) indicates the values of the unit spaces on the upstream side to be calculated.

[Expression 2]

$$MEGR1LDIV[k] = \Sigma(DG1LDIV[k-1] \times R1LDIVZ[k-1] - DG1LDIV[k] \times R1LDVZ[k]) \quad (2)$$

When the EGR masses "MEGR1LDIV[k]" of the unit spaces are obtained, the process proceeds to step S510.

In step S510, the gas mass "MALL1LDIV" of the unit space is calculated by dividing the gas mass "MTHVU" obtained in step S506 by the number of divided unit spaces "n" based on Expression (3) to be represented below.

[Expression 3]

$$MALL1LDIV = MTHVU \div n \quad (3)$$

When the gas mass "MALL1LDIV" of the unit space is obtained, the process proceeds to step S511.

In step S511, the EGR rates "R1LDIV[k]" of the unit spaces are calculated by using the EGR mass "MEGR1LDIV" of the unit space and the gas mass "MALL1LDIV" of the unit space. When the EGR rates "R1LDIV[k]" of the unit spaces are obtained, the process proceeds to step S512.

In step S512, it is determined whether or not the EGR rates "R1LDIV[k]" of all the unit spaces are calculated. That is, when the EGR rates "R1LDIV[k]" of all the unit spaces from "k=1" to "k=n" are calculated, the process is ended. When there is the unit space in which the EGR rate is not calculated, the processes of steps S508 to S511 are performed in the corresponding unit space. When the above-described process of step S502 or SS512 is ended, the process proceeds to step S513.

In step S513, the EGR rate "R1LDIV"n"" of the lowermost downstream unit space is set as the EGR rate "RTHV" of the upstream reference space of the throttle valve 4, and the process in the current calculation cycle is ended. The same process is repeated after the next calculation cycle until the ECU 19 is stopped.

Figure 6:
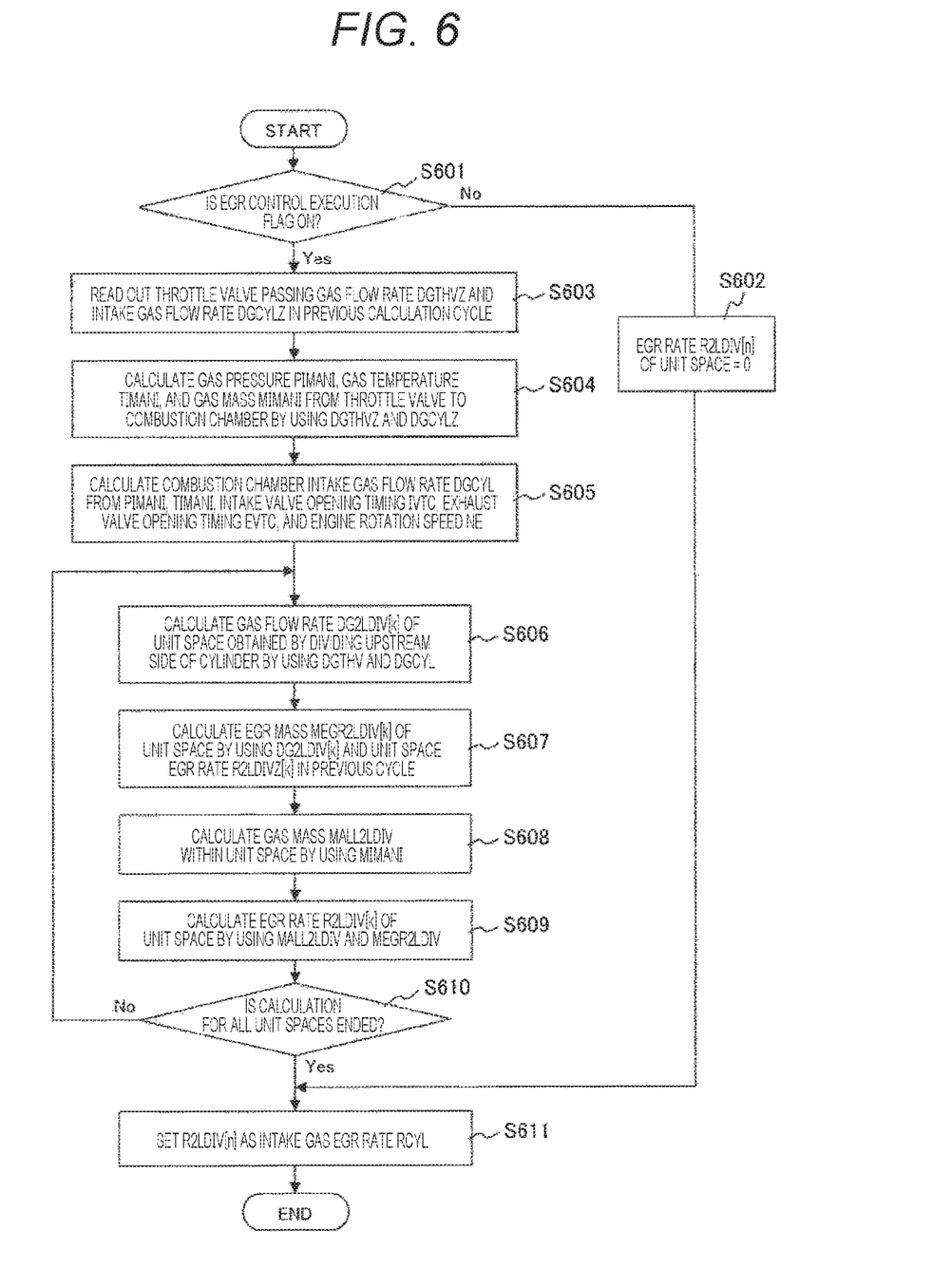
FIG. 6 is a flowchart illustrating a control flow for executing the functional blocks illustrated in FIG. 4 and obtaining an EGR rate in a downstream reference space.

The above description relates to the upstream reference space BSu on the upstream side of the throttle valve 4, but the downstream reference space BSd on the downstream side of the throttle valve 4 will be described below. A control flow illustrated in FIG. 6 illustrates a method of estimating the EGR rate of the downstream reference space BSd at the intake passage 6 from the throttle valve 4 to the combustion chamber 7. In the display of the parameters used for the calculation, "2" indicates the downstream reference space.

In step S601, the same determination process as in step S501 of FIG. 5 is performed. When the EGR execution flag is "OFF", the process proceeds to step S602, the EGR rate is set to "0", and the process proceeds to step S611. Meanwhile, when the EGR control execution flag is "ON", the process proceeds to step S603.

In step S603, the throttle valve passing gas flow rate "DGTHVZ" and the combustion chamber intake gas flow rate "DGCYLZ" calculated in the previous calculation cycle are read out, and the process proceeds to step S604. The above-described parameter "Z" indicates the calculated value in the previous calculation cycle.

Steps S604 to S610 are processes performed such that the inflow gas flow rate "DGIN1" in the calculation of steps S506 to S512 in FIG. 5 is changed to the throttle valve passing gas flow rate "DGTHVZ" and the throttle valve passing gas flow rate "DGTHVZ" is changed to the combustion chamber intake gas flow rate "DGCYL", and thus, the detailed description is omitted.

In step S605, the combustion chamber intake gas flow rate "DGCYL" is calculated from the gas pressure "PIMANI", the gas temperature "TIMANI", the gas mass "MIMANI", the intake valve opening timing "IVTC", the exhaust valve opening timing "EVTC", and the rotational speed "NE" obtained in step S604. Since the calculation in steps S604 and S605 may be performed by a known method, the detailed description thereof is omitted. When the above-described process of step S602 or SS610 is ended, the process proceeds to step S611.

In step S611, the EGR rate "R2LDIV"n"" of the unit space on the lowermost downstream is set as the intake gas EGR rate "RCYL" sucked into the combustion chamber 7 in the downstream reference space of the throttle valve 4, and the process in this calculation cycle is ended. The same process is repeated after the next calculation cycle until the ECU is stopped.

As can be seen from FIGS. 5 and 6, the intake passage is divided into multiple spaces and the EGR rates are sequentially calculated from the intermediate gas flow rates of the unit spaces and the flow rates of the reference spaces. Thus, it is possible to estimate a transient response of the EGR rate with high accuracy.

Figure 7A:
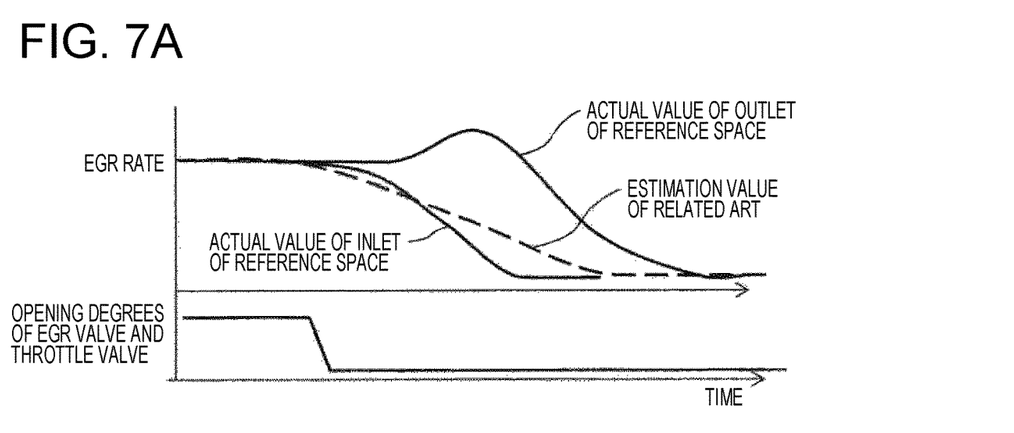
FIGS. 7A to 7C are comparison diagrams illustrating comparison of an EGR rate estimation method of the related art with an EGR rate estimation method according to the present embodiment.
Figure 7B:
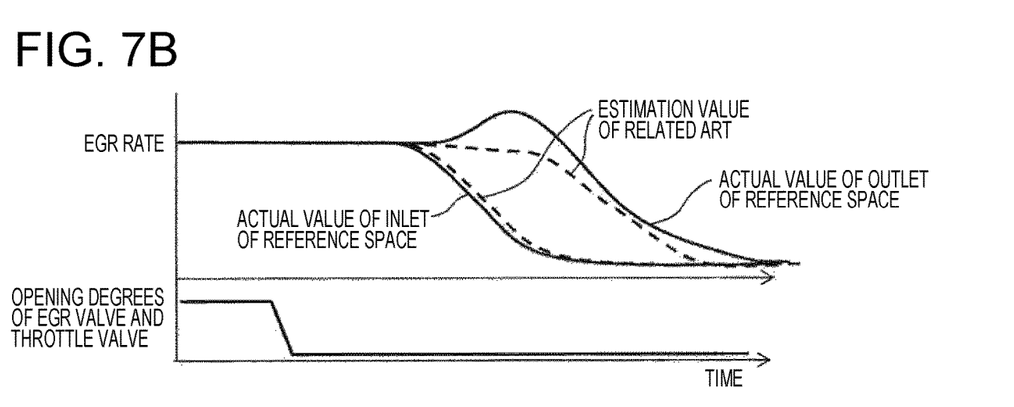
Figure 7C:
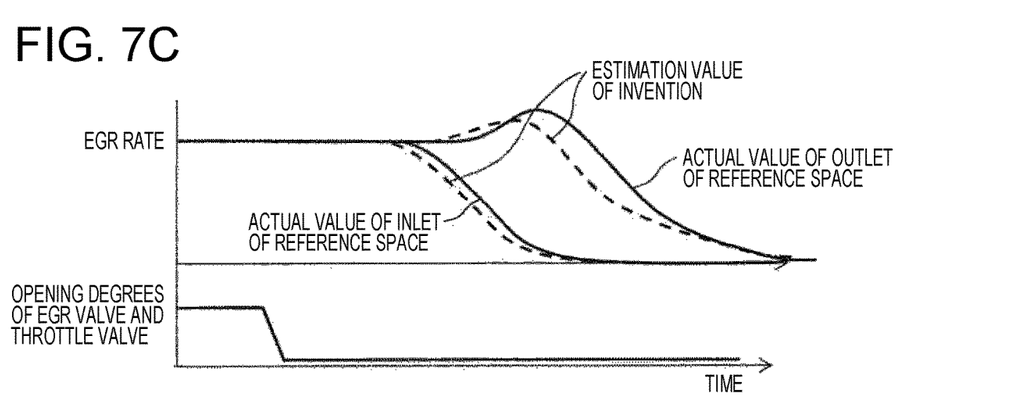

FIG. 7 illustrates the comparison of the estimation results obtained by an EGR rate estimation method of the related art and the EGR rate estimation method according to the present embodiment. (A) and (B) of FIG. 7 illustrate the results of estimating the EGR rates by the estimation method of the related art, and (C) of FIG. 7 illustrates the results of estimating the EGR rates by the estimation method of the present embodiment.

An upper side of each drawing indicates the change of the EGR rate, a solid line indicates the actual EGR rate, and a broken line indicates the estimated EGR rate. A lower side indicates changes in opening degrees of the throttle valve and the EGR valve. Although these valves are actually different from each other, since a case where these valves are simultaneously closed is illustrated, these values are represented by one overlapped solid line.

In (A), (B), and (C) of FIG. 7, when the EGR valve is opened, the EGR gas reaches an outlet of the reference space with a delay. Thus, the EGR rate varies differently at the inlet and the outlet of the reference space. The EGR gas stays at the outlet and the EGR rate increases. As a result, a different change from the inlet is generated.

In (A) of FIG. 7, since the representative EGR rate of the reference space is estimated, there is no distinction between the inlet and the outlet, and a response delay is not able to be simulated. Thus, in (B) of FIG. 7, the delay is set by a time constant. However, in this case, a staying state at the outlet is not able to be estimated.

Meanwhile, in the EGR rate estimation method of the present embodiment, the intermediate gas flow rate is calculated from the gas flow rate of the reference space by using the advection equation, and the estimation calculation of the EGR rate is performed by using the result. Thus, it is possible to simulate an actual delay behavior of the EGR rate, and it is possible to estimate an accurate EGR rate.

Embodiment 2

Although the above-described first embodiment suggests the estimation method of estimating the accurate EGR rate, control for correcting the fuel injection amount and ignition timing by using the calculated combustion chamber intake gas flow rate "DGCYL" and intake gas EGR rate "RCYL" is suggested in a second embodiment of the present invention.

Figure 8:
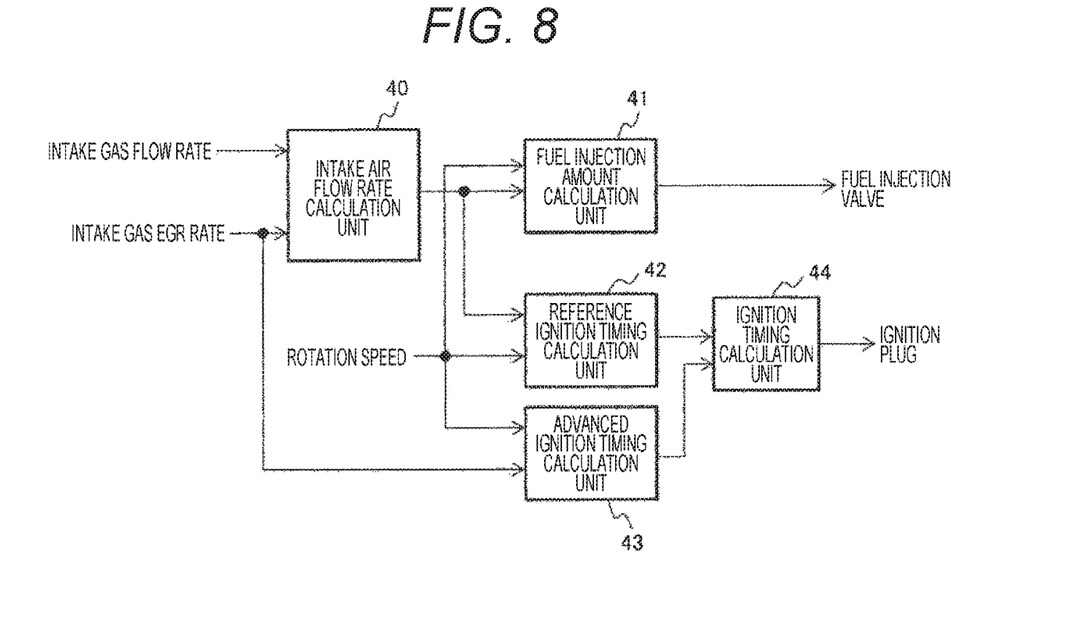
FIG. 8 is a block diagram illustrating functional blocks for calculating a fuel injection amount and an ignition timing.

FIG. 8 illustrates functional blocks for calculating the fuel injection amount and the ignition timing. The combustion chamber intake gas flow rate "DGCYL" and the intake gas EGR rate "RCYL" are input to an intake air flow rate calculation unit 40, and an intake air amount within the combustion chamber is calculated. The obtained intake air amount is input to a fuel injection amount calculation unit 41 and a reference ignition timing calculation unit 42.

The rotational speed and various other correction information are also input to the fuel injection amount calculation unit 41, and the fuel injection amount is calculated based on the input information. The rotational speed is input to the reference ignition timing calculation unit 42, and the reference ignition timing is calculated based on the input rotational speed. The intake gas EGR rate "RCYL" and the rotational speed are input to an advanced ignition timing calculation unit 43, and a corrected ignition timing of the ignition timing is calculated. The reference ignition timing and the corrected ignition timing are input to an ignition timing calculation unit 44, and a final ignition timing is calculated. Needless to say, the fuel injection amount and the ignition timing are corrected not only by the above-described input information but also by various correction information.

Figure 9:
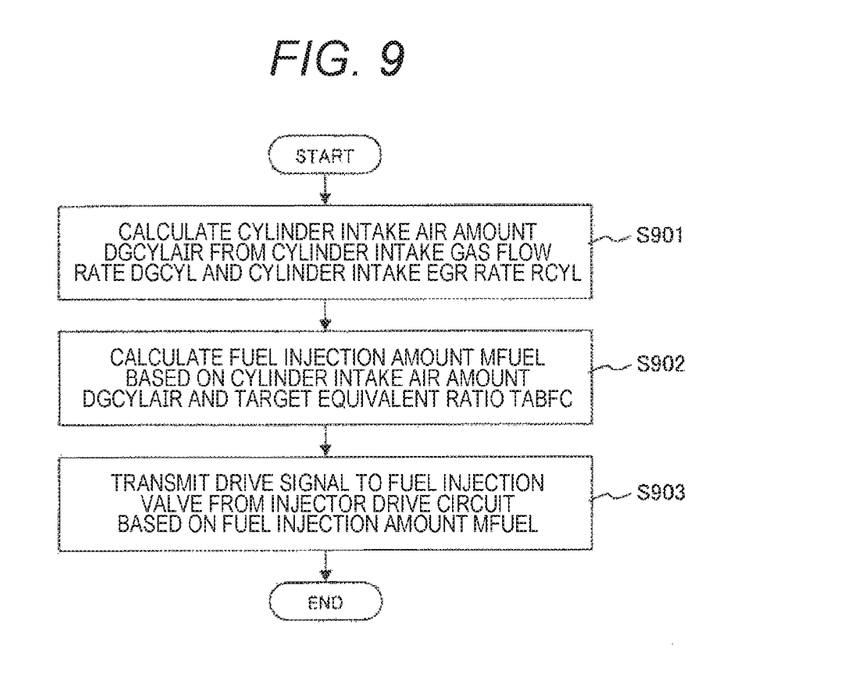
FIG. 9 is a flowchart illustrating a control flow in a case where the fuel injection amount is controlled by using the EGR rate estimation method according to the present embodiment.
Figure 10:
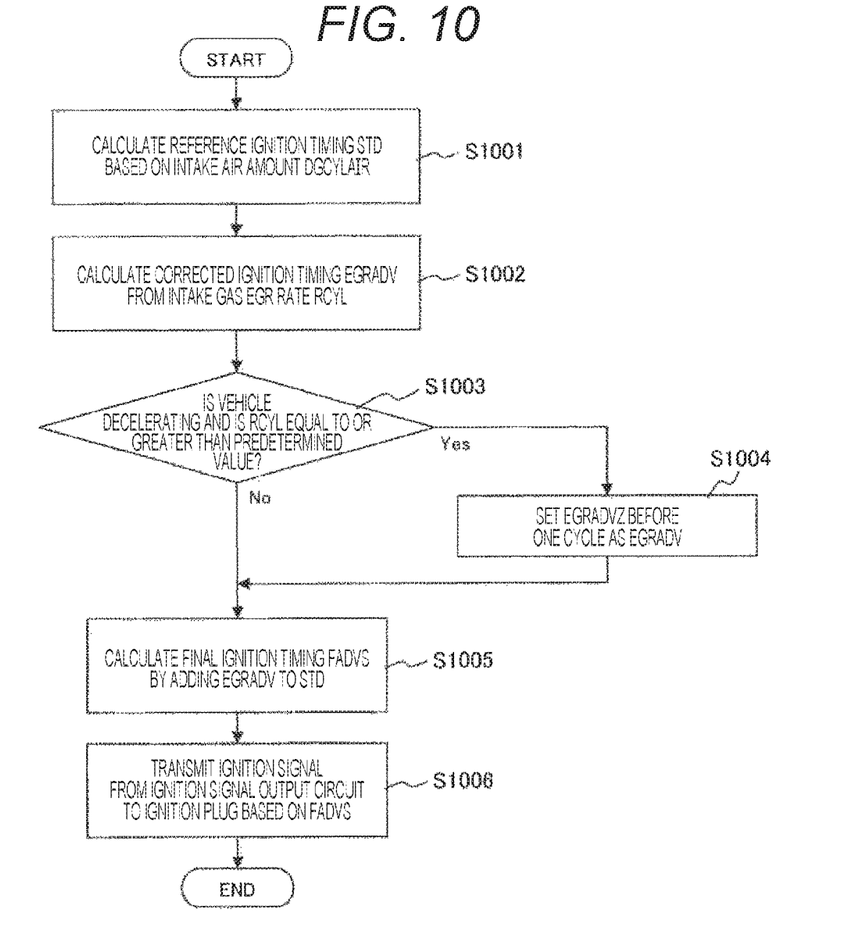
FIG. 10 is a flowchart illustrating a control flow when the ignition timing is controlled by using the EGR rate estimation method according to the present embodiment.

Next, a specific control flow of the above-described calculation block will be described with reference to FIGS. 9 and 10. FIG. 9 illustrates a control flow when the fuel injection amount is controlled, and FIG. 10 illustrates a control flow when the ignition timing is controlled. Initially, the control flow when the fuel injection amount is controlled will be described.

In step S901, the intake air flow rate "DGCYLAIR" is calculated by using the intake gas EGR rate "RCYL" and the combustion chamber intake gas flow rate "DGCYL" based on Expression (4) to be represented blow.

[Expression 4]

$$DGCYLAIR=DGCYL \times (1-RCYL) \quad (4)$$

When the intake air flow rate "DGCYLAIR" is obtained, the process proceeds to step S902.

In step S902, the fuel injection amount "MFUEL" is calculated from the intake air flow rate "DGCYLAIR" based on Expression (5) to be represented below.

[Expression 5]

$$MFUEL=DGCYLAIR \div TABFC \quad (5)$$

The fuel injection amount "MFUEL" is calculated by using a target equivalent ratio "TABFC" calculated by a calculation block (not illustrated). When the fuel injection amount "MFUEL" is obtained, the process proceeds to step S903.

In step S903, the fuel injection amount "MFUEL" is transmitted from an injector drive circuit to the fuel injection valve 8, and actual fuel injection is performed. A signal actually transmitted to the fuel injection valve is a valve opening period of the fuel injection valve 8. However, since the conversion from the fuel injection amount "MFUEL" to the valve opening period is known, the description thereof is omitted.

Next, the control flow when the ignition timing is controlled will be described with reference to FIG. 10.

In step S1001, a reference ignition timing "STD" is calculated based on the intake air amount "DGCYLAIR". Here, the reference ignition timing is read out by using a data table in which the intake air amount "DGCYLAIR" and the reference ignition timing "STD" are associated in advance. When the reference ignition timing "STD" is obtained, the process proceeds to step S1002.

Figure 11:
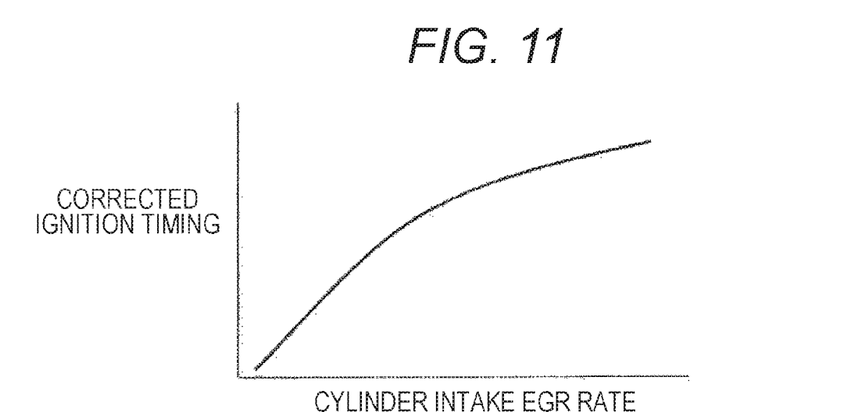
FIG. 11 is a characteristic diagram of a data table representing a relationship between an intake gas EGR rate and a corrected ignition timing.

In step S1002, a corrected ignition timing "EGRADV" is calculated from the intake gas EGR rate "RCYL". As illustrated in FIG. 11, the corrected ignition timing "EGRADV" is also calculated by being read from a data table in which the corrected ignition timing is associated with the intake gas EGR rate "RCYL". In this table, the higher the EGR rate of the gas mixture sucked into the combustion chamber, the more the ignition timing is advanced toward an optimal timing (for example, MBT). That is, the ignition timing is advanced toward the optimal ignition timing as the intake gas EGR rate becomes higher, and the ignition timing is retarded as the intake gas EGR rate becomes lower. When the corrected ignition timing "EGRADV" is obtained, the process proceeds to step S1003.

In step S1003, it is determined whether or not a vehicle is decelerating and the intake gas EGR rate "RCYL" is equal to or greater than a threshold value. When the vehicle is decelerating and the intake gas EGR rate "RCYL" is equal to or greater than the threshold value, the process proceeds to step S1004. Meanwhile, when the vehicle is decelerating and the intake gas EGR rate "RCYL" is not equal to or greater than the threshold value, the process proceeds to step S1005.

In step S1004, the corrected ignition timing "EGRADV" of the previous calculation cycle is retained as the corrected ignition timing "EGRADV" such that the ignition timing is not delayed by a predetermined time. Meanwhile, in step S1005, the final ignition timing "FADVS" is calculated by adding the corrected ignition timing "EGRADV" to the reference ignition timing "STD" calculated in step S1001. In step S1006, an ignition signal is transmitted from the ignition signal output circuit to the ignition plug for each combustion cycle based on the final ignition timing "FADVS".

Figure 12:
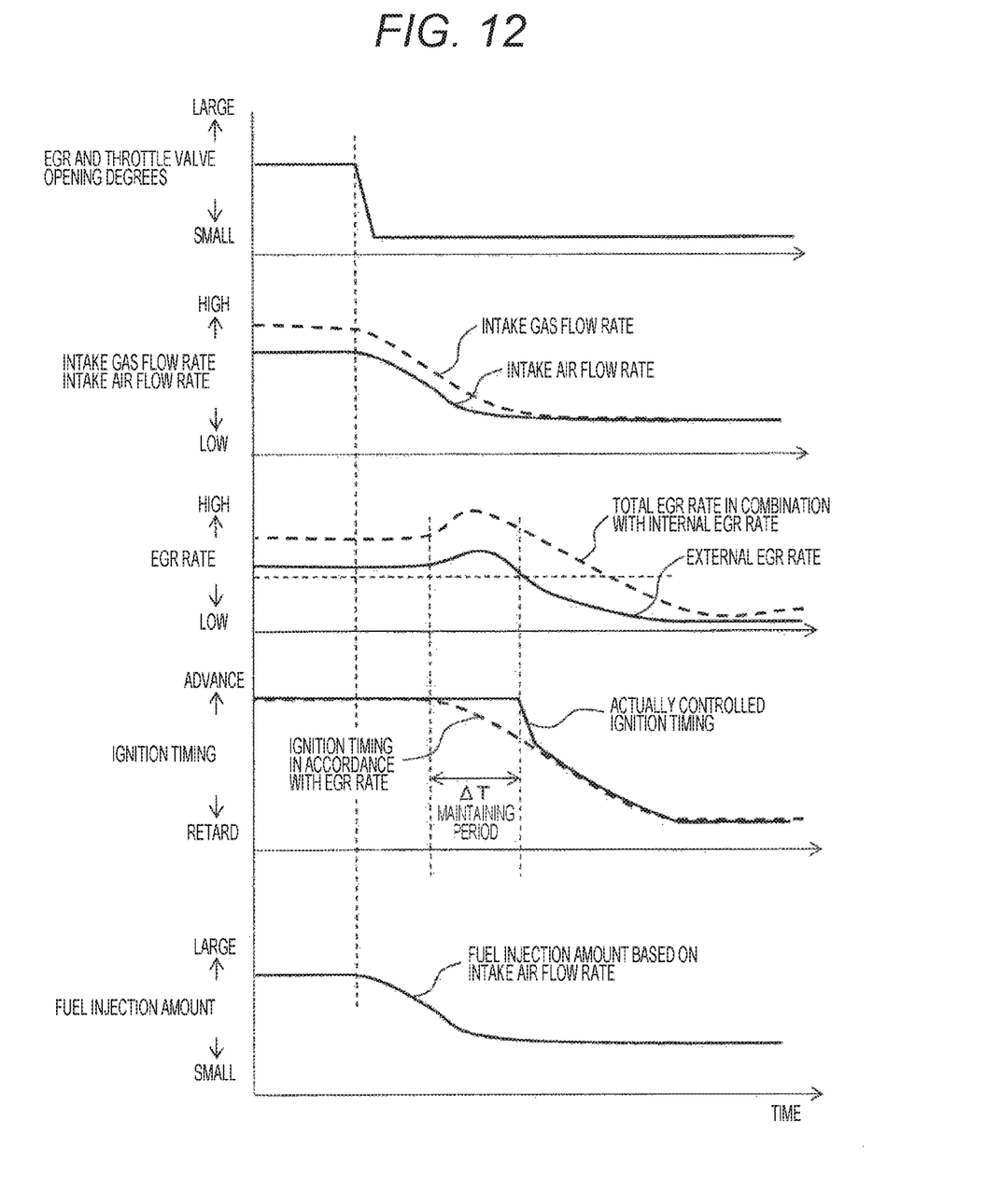
FIG. 12 is a characteristic diagram illustrating temporal changes in EGR rate, ignition timing, and fuel injection amount during transition.

FIG. 12 illustrates a control state of the ignition timing and the fuel injection amount in accordance with the intake gas EGR rate "RCYL" according to the present embodiment.

When the throttle valve 4 and the EGR valve 17 are closed during deceleration, the intake air flow rate and the EGR gas flow rate are decreased. Accordingly, the combustion chamber intake gas flow rate and the intake air flow rate into the combustion chamber are also decreased. Since there is a difference in responsiveness between the change in EGR rate and the change in air flow rate, it is possible to calculate the actual intake air flow rate by subtracting the EGR gas flow rate from the combustion chamber intake gas flow rate which is the flow rate of the gas mixture of the air and the EGR gas. Thus, it is possible to calculate the fuel injection amount that reflects a target air-fuel ratio based on the air flow rate.

Meanwhile, since the EGR rate is a high EGR rate in combination with an internal EGR rate (residual gas rate) in addition to the estimated intake gas EGR rate (RCYL), there is a possibility of misfire when the ignition timing is rapidly retarded. Thus, as in step S1004, the ignition timing is maintained in the advanced state for a predetermined time or a predetermined period ΔT until the EGR rate is equal to or less than a predetermined amount. When the predetermined period ΔT has elapsed, the ignition timing is gradually shifted in a retarded direction in accordance with the intake gas EGR rate "RCYL".

According to the fuel injection control of the present embodiment, it is possible to realize an appropriate air-fuel ratio, and it is possible to prevent an exhaust harmful component from being increased even though the EGR gas is introduced. According to the ignition timing control of the present embodiment, it is possible to reduce fuel consumption while avoiding abnormal combustion by setting the ignition timing in accordance with the EGR rate in normal times, and it is possible to avoid misfire due to an increase in internal EGR rate which is difficult to be estimated during deceleration.

As described above, according to the present invention, the unit spaces are formed by dividing the reference space of the intake passage into the plurality of spaces along the streamline through which the gas mixture of the intake air and the EGR gas flows, the physical model based on the advection equation for estimating the EGR rate of the gas mixture is established so as to correspond to each unit space, and the EGR rate at which the gas mixture flows into the combustion chamber is estimated by sequentially estimating the EGR rates of the unit spaces connected to the head unit spaces from the head unit spaces by the physical model. Accordingly, it is possible to estimate the EGR rate with high accuracy even in the transient state in which the operating state of the internal combustion engine is variously changed.

The present invention is not limited to the aforementioned embodiments, and includes various modification examples. For example, the aforementioned embodiments are described in detail in order to facilitate easy understanding of the present invention, and are not limited to necessarily include all the described components. Some of the components of a certain embodiment can be substituted into the components of another embodiment, and the components of another embodiment can be added to the component of a certain embodiment. In addition, the components of another embodiment can be added, removed, and substituted to, from, and into some of the components of the aforementioned embodiments.

REFERENCE SIGNS LIST 1 internal combustion engine
2 mass flowmeter
3 pressure adjustment valve
4 throttle valve
5a compressor
6 intake passage
7 combustion chamber
8 fuel injection valve
9 ignition plug
10 three-way catalyst
11 air-fuel ratio sensor
12 exhaust manifold
13 exhaust pipe
14 second three-way catalyst
15 EGR pipe
16 EGR cooler
17 EGR valve
18 pressure sensor
19 control unit
20 accelerator opening degree sensor
22 intercooler
23 surge tank
BSu upstream reference space
BSd downstream reference space
USu1 to USun unit space
USd1 to USdn unit space
25 throttle upstream inflow gas flow rate calculation unit
26 throttle upstream pressure/temperature/mass calculation unit
27 throttle gas flow rate calculation unit
28 intermediate gas flow rate calculation unit
29, 30, 31 unit space EGR gas mass calculation unit
32, 33, 34 unit space EGR rate calculation unit

The invention claimed is:

1. A control device of an internal combustion engine that includes control means which is for use in the internal combustion engine including an intake passage which is connected to a combustion chamber and supplies an intake air to the combustion chamber, an exhaust gas recirculation passage which is connected to the intake passage and recirculates an exhaust gas (hereinafter, referred to as an EGR gas), and a throttle valve which controls a flow rate of a gas mixture of the intake air and the EGR gas, and for estimating a ratio (hereinafter, referred to as an EGR rate) of the EGR gas to the gas mixture to be supplied to the combustion chamber,
wherein the control means includes EGR rate estimation means for forming unit spaces by dividing a reference space of the intake passage into a plurality of spaces along a streamline through which the gas mixture of the intake air and the EGR gas flows, establishing a physical model based on an advection equation for estimating the EGR rate of the gas mixture so as to correspond to each of the unit spaces, and estimating the EGR rate at which the gas mixture flows into the combustion chamber by sequentially estimating the EGR rates of the unit spaces connected to head unit spaces from the head unit spaces by the physical model.

2. The control device of an internal combustion engine according to claim 1,
wherein the EGR rate estimation means includes
a unit space gas mass calculation unit that calculates a unit space gas mass of the unit space from a gas mass of the reference space,
an intermediate gas flow rate calculation unit that calculates an intermediate gas flow rate of each of the unit spaces based on a gas flow rate at an inlet and a gas flow rate at an outlet of each of the unit spaces,
a unit space EGR gas mass calculation unit that obtains a unit space EGR gas mass of each of the unit spaces from the intermediate gas flow rate calculated by the intermediate gas flow rate calculation unit and the EGR rate, and a unit space EGR rate calculation unit that sequentially calculates new EGR rates of the gas mixture from the head unit space based on the unit space gas mass obtained by the unit space gas mass calculation unit and the unit space EGR gas mass obtained by the unit space EGR gas mass calculation unit.

3. The control device of an internal combustion engine according to claim 2, wherein the unit space gas mass calculation unit obtains the unit space gas mass by dividing the gas mass of the reference space by the number of unit spaces.

4. The control device of an internal combustion engine according to claim 2, wherein the reference space is set with a cross-sectional area change portion at which a cross-sectional area of the intake passage is enlarged or reduced as a boundary.

5. The control device of an internal combustion engine according to claim 2, wherein volumes of the unit spaces are set to be equal to each other.

6. The control device of an internal combustion engine according to claim 2, wherein an intercooler or a surge tank is provided in a middle of the intake passage, and the intercooler or the surge tank is independently set as the unit space or is set as a plurality of the unit spaces.

7. The control device of an internal combustion engine according to claim 2, wherein the number of divided unit spaces is set based on a volume of the intake passage and a maximum gas flow rate at which the gas mixture flows into the internal combustion engine.

8. The control device of an internal combustion engine according to claim 2, wherein the reference space is set as an upstream reference space from the throttle valve to a region to which the EGR gas is introduced and a downstream reference space from the throttle valve to an inlet of the combustion chamber with the throttle valve provided at the intake passage as a boundary, and the EGR rate of the unit space at a rearmost portion of the upstream reference space is set as the EGR rate of the unit space at a head portion of the downstream reference space.

9. The control device of an internal combustion engine according to claim 1, wherein the control means includes ignition control means for igniting an air-fuel mixture of the combustion chamber, and the ignition control means includes ignition timing correction means for correcting an ignition timing based on the EGR rate estimated by the EGR rate estimation means.

10. The control device of an internal combustion engine according to claim 9, wherein the ignition control means advances the ignition timing toward an optimal ignition timing as the EGR rate becomes higher, and retards the ignition timing as the EGR rate becomes lower.

11. The control device of an internal combustion engine according to claim 10, wherein the ignition control means retards the ignition timing in accordance with the EGR rate after the EGR rate estimated by the EGR rate estimation means is equal to or less than a predetermined value in a state in which an ignition timing when the throttle valve is closed and an EGR gas flow rate is reduced is maintained.

\* \* \* \* \*